(12) United States Patent
Shekhawat et al.

(10) Patent No.: US 7,651,020 B2
(45) Date of Patent: *Jan. 26, 2010

(54) AMPHIPHILIC BLOCK COPOLYMERS FOR IMPROVED FLUX APPLICATION

(75) Inventors: Linda A. Shekhawat, Tucson, AZ (US); Anna M. Prakash, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 11/965,661

(22) Filed: Dec. 27, 2007

(65) Prior Publication Data

US 2009/0169721 A1    Jul. 2, 2009

(51) Int. Cl.
*B23K 31/02* (2006.01)
*B23K 35/22* (2006.01)

(52) U.S. Cl. .................. 228/180.22; 228/207; 228/223; 148/22

(58) Field of Classification Search ........................ None
See application file for complete search history.

(56) References Cited

U.S. PATENT DOCUMENTS

| | | | |
|---|---|---|---|
| 5,989,362 A * | 11/1999 | Diamant et al. .............. 148/23 |
| 6,458,472 B1 * | 10/2002 | Konarski et al. ............ 428/620 |
| 2002/0158111 A1 * | 10/2002 | Kelley et al. ................. 228/214 |
| 2003/0054036 A1 * | 3/2003 | Liggins et al. .............. 424/486 |
| 2003/0157170 A1 * | 8/2003 | Liggins et al. .............. 424/468 |
| 2003/0198825 A1 * | 10/2003 | Mayes et al. ................. 428/522 |
| 2004/0110877 A1 * | 6/2004 | Becker ........................ 524/114 |
| 2004/0197408 A1 * | 10/2004 | Gravett ........................ 424/486 |
| 2005/0282956 A1 * | 12/2005 | Wang et al. .................. 524/555 |
| 2008/0014149 A1 * | 1/2008 | Murthy et al. .............. 424/9.36 |
| 2008/0132564 A1 * | 6/2008 | Liggins et al. .............. 514/449 |
| 2008/0146652 A1 * | 6/2008 | Liggins et al. .............. 514/449 |
| 2008/0156852 A1 * | 7/2008 | Prakash ....................... 228/256 |
| 2008/0239660 A1 * | 10/2008 | Mustapha et al. ........... 361/688 |
| 2008/0274454 A1 * | 11/2008 | Mirkin et al. ................... 435/6 |
| 2008/0305336 A1 * | 12/2008 | Wang et al. ............. 428/402.24 |
| 2009/0076220 A1 * | 3/2009 | Shekhawat et al. ............ 525/89 |
| 2009/0087644 A1 * | 4/2009 | Supriya et al. .............. 428/327 |

OTHER PUBLICATIONS

Sun, P. et al., "Mobility, Miscibility, and Microdomain Structure in Nanostructured Thermoset Blends of Epoxy Resin and Amphiphilic Poly(ethylene oxide)-*block*-poly(propylene oxide)-*block*-poly(ethylene oxide) Triblock Copolymers Characterized by Solid-State NMR", *Macromolecules*, 38, 5654-5667 (2005).*

(Continued)

*Primary Examiner*—Kiley Stoner
(74) *Attorney, Agent, or Firm*—Konrad Raynes & Victor LLP; Alan S. Raynes

(57) ABSTRACT

Embodiments include materials which may be used during electronic device fabrication, including a flux material. The flux material comprises a solution including a plurality of micellar structures in a solvent, the micellar structures each including a plurality of amphiphilic block copolymer elements. The amphiphilic block copolymer elements each include at least one non-polar region and at least one polar region. A fluxing agent is contained within the micellar structures. Other embodiments are described and claimed.

14 Claims, 4 Drawing Sheets

OTHER PUBLICATIONS

Larranaga, M. et al., "Cure kinetics of epoxy systems modified with block copolymers", *Polym Int.*, 53, 1495-1502 (2004).*

Nardin, J. et al., "Amphiphilic block copolymer nanocontainers as bioreactors", *Eur. Phys. J. E* 4, 403-410 (2001).*

Forster, S. et al., "From Self-Organizing Polymers to Nanohybrid and Biomaterials", *Angew. Chem. Int. Ed.*, 41, 688-714 (2002).*

Gillies, E. R. et al., "Development of acid-sensitive copolymer micelles for drug delivery", *Pure Appl. Chem.*, vol. 76, Nos. 7-8, 1295-1307 (2004).*

Varshney, M. et al. "Pluronic Microemulsions as Nanoreservoirs for Extraction of Bupivacaine from Normal Saline", *JACS*, 126, 5108-5112 (2004).*

* cited by examiner

AMPHIPHILIC BLOCK COPOLYMERS FOR IMPROVED FLUX APPLICATION

RELATED ART

A variety of fluxing materials may be used during the formation of electronic devices. Certain materials such as acids and other reagents are being investigated for use. Interactions between the reagent and the surfaces to be joined, or interactions between the reagent and other components in the flux material, may result in problems due to acid/base reactions or solvent solubility. In addition, certain flux formulation leave behind a large residue ring that can cause problems such as delamination.

BRIEF DESCRIPTION OF THE DRAWINGS

Embodiments are described by way of example, with reference to the accompanying drawings, which are not drawn to scale, wherein:

FIG. 1(B) illustrating the formation of stable polymer templates in a polar solvent using the block copolymer; and FIG. 1(C) illustrating the positioning of a nonpolar reagent in a core region of the polymer templates, in accordance with certain embodiments.

FIG. 2(B) illustrating the phase separation of the polymer template having the reagent therein during a heating operation; and FIG. 2(C) illustrating the solder bumps coupled to the bonding pads, in accordance with certain embodiments.

FIG. 3(B) illustrating the formation of stable polymer templates in a polar solvent using the block copolymer; and FIG. 3(C) illustrating the positioning of a nonpolar reagent in a core region of the polymer templates, in accordance with certain embodiments.

DETAILED DESCRIPTION

Figure 1A:
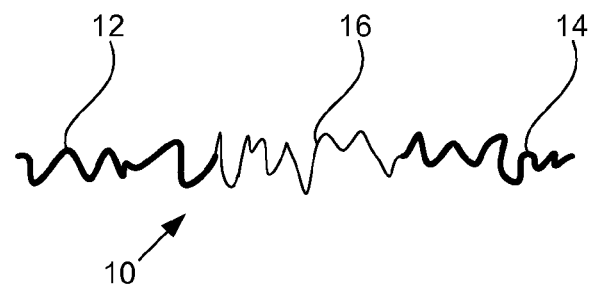
FIGS. 1(A)-1(C) illustrate an amphiphilic triblock copolymer and the formation of polymer templates, with FIG. 1(A) illustrating a triblock copolymer having hydrophilic end regions and a hydrophobic central region.

Certain embodiment relate to the use of materials such as polymers which have micelle forming ability and which may be used during interconnect processes for joining components in electronic assemblies.

In one aspect of certain embodiments, the polymers which have micelle forming ability are amphiphilic block copolymers including discrete segments of hydrophobic and hydrophilic character. Such amphiphilic block copolymers may be configured to serve as polymer templates including a core region than can house another material, such as a material used in a fluxing operation. Such embodiments may be used to form improved formulations such as fluxes for Pb-free solders, that are transparent to the passivation material.

Amphiphilic block copolymers may include one or more hydrophobic block parts and one or more hydrophilic block parts. Examples of hydrophobic blocks include, but are not limited to, poly(alkyl ethers), poly($\epsilon$-caprolactone), polystyrene, poly(methyl methacrylate), polyactides. Examples of hydrophilic blocks include, but are not limited to, polyethylene oxide), and poly(vinyl alcohol). Examples of commercially available materials include, but are not limited to, PLURONICS L44 and PLURONICS F127.

The end groups of the amphiphilic block copolymer may be functionalized with functional groups to help promote adsorption onto the surfaces to be joined, for example, bonding pads and/or solder bumps. Examples of bonding pad and solder bump materials include, but are not limited to, metals such as Cu, Sn, Ag, Pb, and alloys including these and other materials. Examples of functional groups that may help promote adsorption include, but are not limited to, organosilanes, zirconates, alkyl phosphate esters, amines, and metal organics.

In certain embodiments, the amphiphilic block copolymers are formed into micelles that can carrying ingredients that would otherwise precipitate or chemically interact with other ingredients in a flux. Amphiphilic block copolymer chemical composition and topology give them flexibility to be soluble and/or compatible in non-polar or polar environments. The discrete blocks may self assemble depending on the environment, because of the amphiphilic (hydrophobic/hydrophilic) dual nature of the blocks. The hydrophilic part may be utilized to maintain dispersion in the solvent for fluxing operations. A variety of solvents may be used, including, but not limited to, water, glycol ethers, and alcohols. In certain embodiments, the polymer template having the micellar structure will have a diameter of about 20 to about 100 nanometers. The micellar structure of the polymer template is similar in some ways to an oil-in-water micellar structure.

When a solder reflow operation is carried out, the heat causes the micellar structure to become unstable, decompose, and break apart, and the fluxing agent stored in the micelle core is released. The amphiphilic block copolymers may be removed with conventional deflux methods, or may require no deflux in certain situations, for example, where their residue is compatible with the underfill materials, such as epoxies. When a suitable underfill (for example, epoxy) is introduced, the hydrophobic segment may enable the copolymer to be dissolved and solubilized by the underfill material.

Figure 1B:
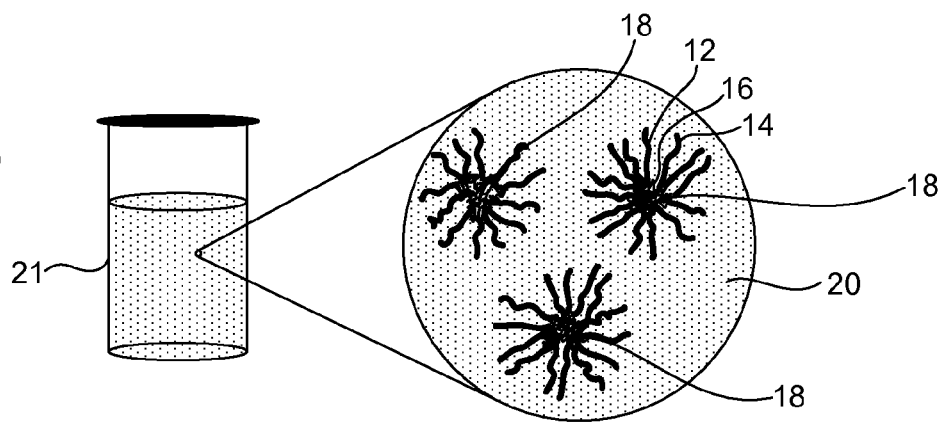
Figure 1C:
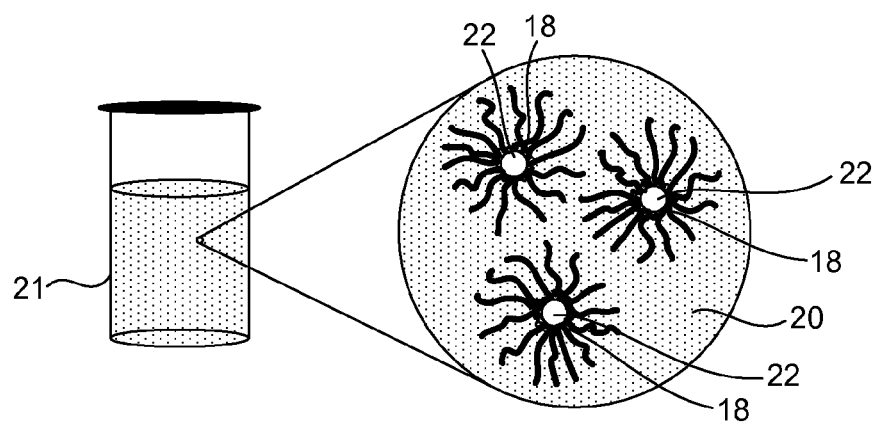

Certain embodiments will be discussed in connection with FIGS. 1-3. FIGS. 1(A)-1(C) illustrate the formation of polymer templates having a reagent positioned in a core region, in accordance with certain embodiments. FIG. 1(A) illustrates a triblock copolymer 10 having hydrophilic end regions 12, 14 and a hydrophobic central region 16. The hydrophilic end regions 12, 14 are polar, whereas the hydrophobic central region 16 is non-polar. As illustrated in FIG. 1(A) and other figures, the hydrophilic end regions 12,14 are illustrated as thicker than the hydrophobic central region 16 so that the different regions can be readily observed, for identification purposes only.

The formation of polymer templates having a thermodynamically stable micellar structure may be carried out by mixing the block copolymer elements with a polar solvent, for example, 10-40 weight percent of the block copolymer 10 with water 20, in a container 21. FIG. 1(B) illustrates the polymer templates 18 formed with a micellar structure. In the polymer templates 18, the non-polar, hydrophobic polymer parts 16 migrate together in a central region of the micellar structure in order to limit interactions with the polar solvent (water 20). The polar, hydrophilic polymer parts 12, 14 protrude out from the central region of the micellar structure into the polar solvent (e.g., water 20), and act to stabilize the micelle and form a shell-like structure around the central region.

The polymer template 18 having the micellar structure can act as a container for housing a material to be used in a process such as a fluxing process. As illustrated in FIG. 1(C), a non-polar material 22 such as an acid or a chelating agent may be added and the non-polar material will migrate towards the central region of the polymer template 18. The micellar structure of the polymer templates 18 will have a lower critical solution temperature (LCST) at which the micelles become thermodynamically unstable and phase separation occurs. Thus, during a later fabrication heating process, such as a reflow process, the micellar structure of the polymer template will become unstable and break apart, thus releasing the non-polar material 22.

Figure 2A:
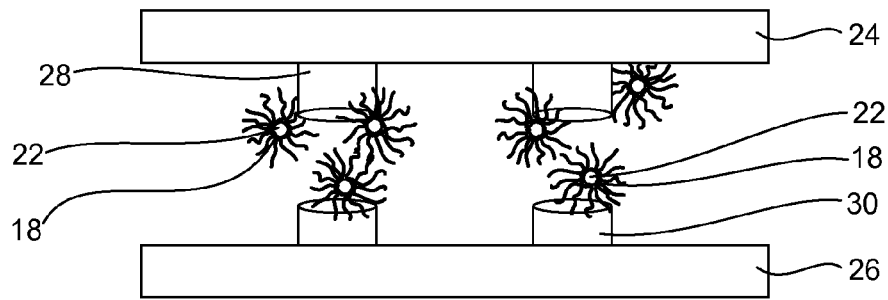
FIGS. 2(A)-2(C) illustrate the use of polymer templates having a reagent positioned in a core region thereof, during the processing of an electronic assembly, with FIG. 2(A) illustrating polymer templates having a reagent therein adhered to the bonding pads on a first device and to the solder bumps on a second device.
Figure 2B:
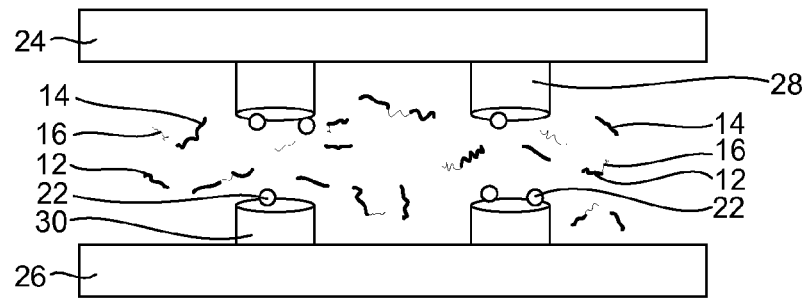
Figure 2C:
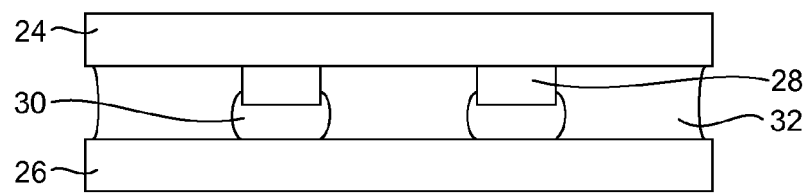

FIGS. 2(A)-2(C) illustrate the use of polymer templates such as those described in connection with FIGS. 1(A)-1(C) above, including a material positioned in a core region thereof, during the processing of an electronic device. FIG. 2(A) illustrates devices 24 and 26 to be joined. The device 24 may, for example, be a semiconductor die having bonding pads 28 positioned thereon. The device 26 may, for example, be a substrate having solder bumps 30 positioned thereon. FIG. 2(A) also illustrates polymer templates 18 including non-polar material 22 therein, that are positioned on and adjacent to the surfaces to be joined. The polymer templates 18 are formed to adhere to the materials of the bonding pads 28 and the solder bumps 30. This may be carried out through the use of, for example, functional groups that have an affinity for the bonding pad surface.

A heating operation such as reflow of the solder bumps 30 may be carried out in certain embodiments at a temperature above the LCST of the polymer templates (for example, 75-80 degrees Celsius). At such time the micellar structure of the polymer templates 18 will break apart and release the non-polar material 22, as illustrated in FIG. 2(B). For example, if the reagent is an acid, for example, it will be released from the micellar structure of the polymer templates 18, and a thiol group on the acid will have an affinity for the metal of the bonding pads and solder bumps. This will lead to localized fluxing on the metal surfaces to be joined. Such a process may be able to reduce the overall amount of acid or other materials used to remove oxides from the metal surfaces, through the use of the polymer templates. By reducing the amount of acid (or other materials positioned in the polymer template) used, the amount of acid or other residue remaining after reflow is minimized, which reduces the likelihood of problems such as delamination due to residual acid attacking certain layers (such as passivation layers) in the assembly.

FIG. 2(C) illustrates the electronic assembly after the devices 24 and 26 are joined, and after an underfill material 32 has been introduced between the devices and around the bonding pads and solder regions. The underfill material 32 may be selected so that it will solubilize the amphiphilic block copolymer.

As illustrated in FIG. 1(A), certain embodiments may utilize block copolymer elements having a triblock structure including polar end regions and a non-polar central region. Examples of materials that may have such a triblock structure include, but are not limited to, poly(ethylene oxide)-b-poly (butylene oxide)-b-poly(ethylene oxide), poly(ethylene oxide)-b-poly(ε-caprolactone)-b-poly(ethylene oxide), and poly(ethylene oxide)-b-poly(propylene sulfide)-b-poly(ethylene oxide). Sulfur groups may act to provide an advantage because the sulfur groups have an affinity to metals including Cu and typical solder materials.

Figure 3A:
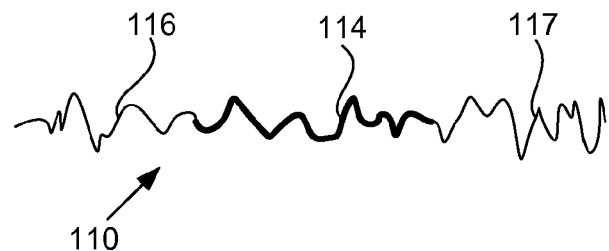
FIGS. 3(A)-3(C) illustrate an amphiphilic triblock copolymer and the formation of polymer templates, with FIG. 3(A) illustrating a triblock copolymer having hydrophobic end regions and a hydrophilic central region.
Figure 3B:
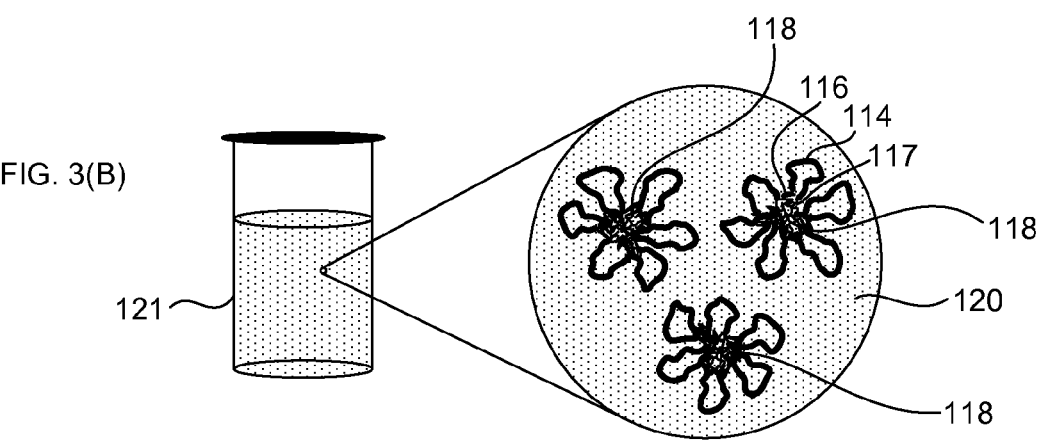
Figure 3C:
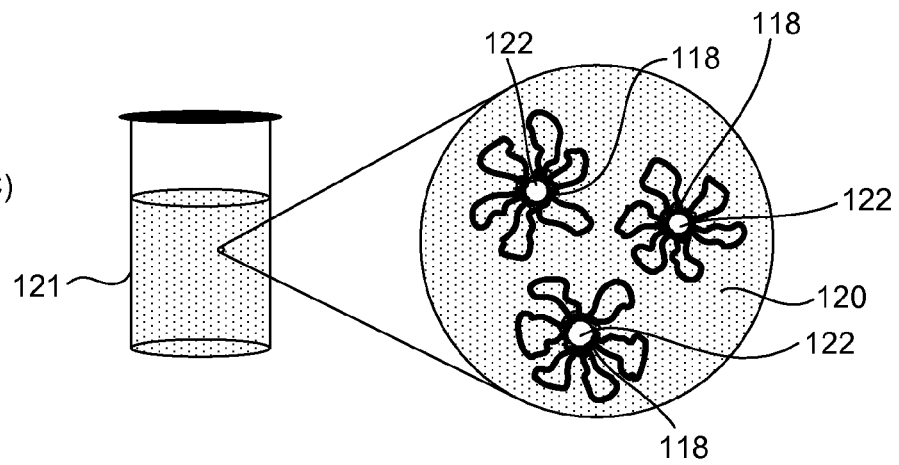

Embodiments also include block copolymer elements having a triblock structure including non-polar end regions and a polar central region, as illustrated in FIGS. 3(A)-3(C). FIG. 3(A) illustrates a block copolymer 110 having a hydrophilic central region 114 and a hydrophobic end regions 116, 117. The hydrophilic central region 114 is polar, whereas the hydrophobic end regions 116, 117 are non-polar. Examples of materials having a triblock structure including non-polar end regions and a polar central region include, but are not limited to, poly(propylene sulfide)-b-poly(ethylene oxide)-b-poly (propylene sulfide), and poly(propylene oxide)-b-poly(ethylene oxide)-b-poly(propylene oxide).

As illustrated in FIG. 3(B), for example, when 10-40 weight percent of the block copolymer 110 is mixed with water 120 in a container 121, polymer templates 118 are formed with a micellar structure, in which the hydrophobic, non-polar polymer block regions 116, 117 migrate together in a central region of the micellar structure, and the hydrophilic, polar regions 114 form a flower-like structure extending outward from the central region. As illustrated in FIG. 3(C), a non-polar material 122 may be added and the non-polar material will migrate towards the central regions of the polymer templates 118. The resultant polymer template 118 with the material 122 therein may then be utilized in subsequent processes such as flux processes, as described above.

Figure 4A:
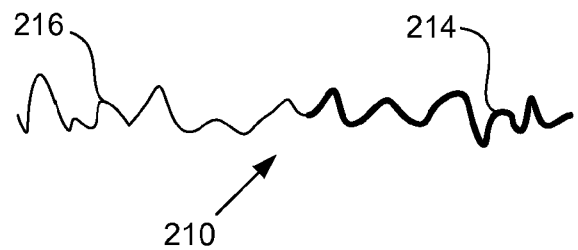
FIGS. 4(A)-4(C) illustrate an amphiphilic diblock copolymer and the formation of polymer templates, with FIG. 4(A) illustrating a diblock copolymer having a hydrophilic region and a hydrophobic region, FIG. 4(B) illustrating the formation of stable polymer templates in a polar solvent using the diblock copolymer, and FIG. 4(C) illustrating the positioning of a reagent in a core region of the polymer templates, in accordance with certain embodiments.
Figure 4B:
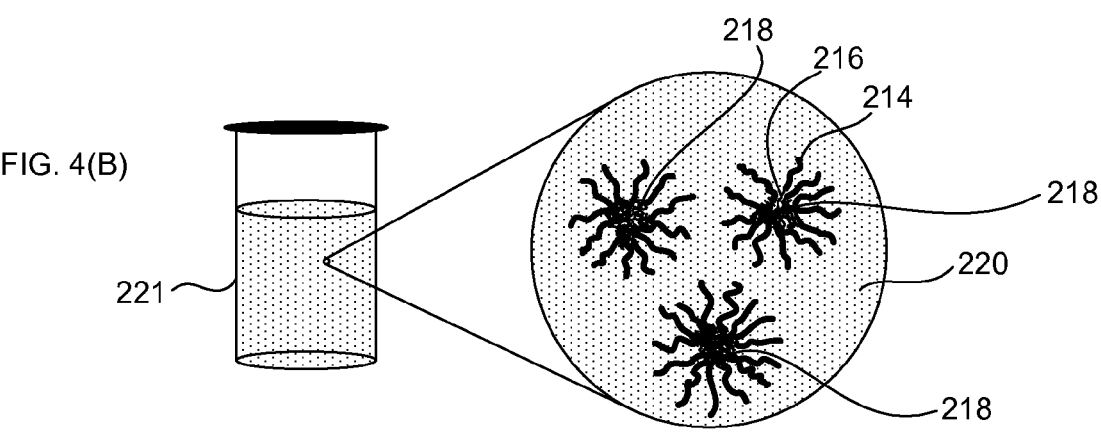
Figure 4C:
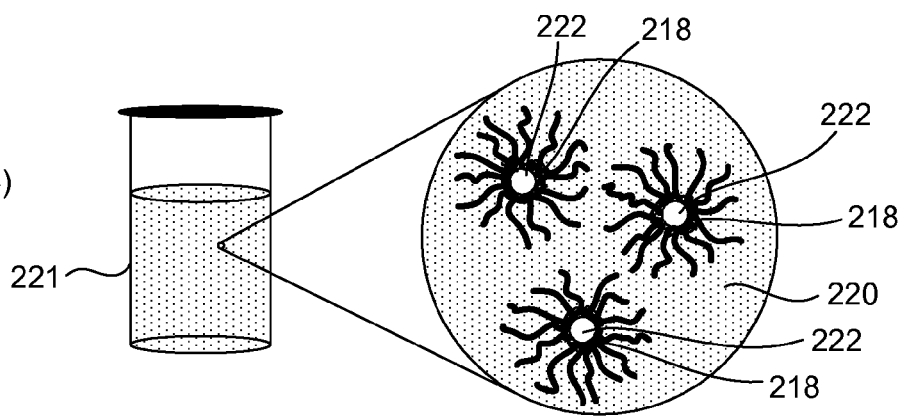

Certain embodiments may also utilize block copolymer elements having a diblock structure including one non-polar end region and one polar end region, as illustrated, for example, in FIG. 4(A), which shows hydrophilic end region 214 and hydrophobic end region 216. Examples of diblock copolymers include, but are not limited to, poly(propylene oxide)-b-poly(ethylene oxide), and poly(dimethylsiloxane)-b-poly(ethylene oxide). The individual block copolymer elements, upon mixing with water 220 in a container 221, assemble into micellar structures 218, which have the polar, hydrophilic end regions extending outward and the non-polar, hydrophobic end regions extending inward into the core portion of the micelle, as illustrated in FIG. 4(B). A non-polar material 222, when added, will migrate to the central portion of the micelle, as illustrated in FIG. 4(C). The resultant polymer template 218 with the material 222 therein may then be utilized in subsequent processes such as flux processes, as described above.

Certain examples of specific process embodiments that may utilize polymer template structures as described above include, but are not limited to, the following.

In one process embodiment example, the polymer template structure is utilized to incorporate water insoluble acids, acids that tend to crystallize out of solution when mixed directly with other components, and/or other highly reactive acids. For example, an acid such as trimesic acid may be essentially encapsulated in the hydrophobic core of a polymer template such as described above. The terminal hydroxyl groups on the amphiphilic block copolymer may, if desired, be functionalized with chemical functional groups for complexing the metal interfaces (for example, of bonding pads and/or solder bumps) to help localize the delivery of suitable fluxing agents stored in the micelle core structure of the polymer template.

In another process embodiment example, polymer template structures are used to reduce undesirable acid-base interactions of flux components, for example, that lead to precipitation. Micellar structured polymer templates are formed with the amphiphilic block copolymer in concentration of about 10-40 weight percent in water and/or glycol ethers, where chelating agents or additives which enhance fluxing but normally interact with acids are encapsulated in the hydrophobic core of the micellar structure. The terminal hydroxyl groups on the amphiphilic block copolymer may, if desired, be functionalized with chemical functional groups for complexing the metal interfaces to help localize the delivery of suitable fluxing agents stored in the micelle core structure of the polymer template.

Another process embodiment example which may, depending on the materials used, overlap with the other examples, relates to materials encapsulated in the core region of the micellar structure to minimize environmental health safety (EHS) issues such as, for example, odors. Such materials may include, but are not limited to, thiol containing acids such as $HS(CH_2)_{15}$—COOH. The thiol moiety should complex with the metal (for ex., Cu/Sn/Ag, Cu/Sn/Pb) to help localize the acid for fluxing. Again, the terminal hydroxyl groups on the amphiphilic block copolymer may, if desired, be functionalized with chemical functional groups for complexing the metal interfaces to help localize the delivery of suitable fluxing agents stored in the micelle core structure of the polymer template.

A specific amphiphilic block copolymer was tested to illustrate aspects of embodiments described above. The amphiphilic block copolymer was PLURONICS L44, having the following chemical composition:

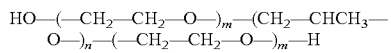

where m=11 and n=20, resulting in a 45.5 weight percent ethylene oxide copolymer. The average molecular weight was 2000 g/mole, the hydrophilic-lipophilic balance ratio (HLB) was 14, and the surface tension at 25 degrees Celsius was 40 dyne/cm.

A series of polymer in water mixtures (10, 15, 20, 25, 20, 35, and 40 weight percent copolymer) were placed into a vial with a screw cap. The samples were stirred by vortex mixing to obtain transparent solutions having polymer templates with micellar structures therein. A small amount of non-polar hexanoic acid (0.02 g) was added to the solution and vortex mixed for several seconds in order to determine the maximum amount of acid encapsulated. The hexanoic acid migrated into the center of the non-polar core of the micellar structure of the polymer templates. The solution remained transparent. When the maximum quantity of acid was exceeded in a given sample, the solution would turn slightly blue hazy to opaque, indicative of a macroemulsion or phase separation, respectively. The ideal solution has the maximum concentration of non-polar acid with the minimum amount of polymer in water and is transparent.

While certain exemplary embodiments have been described above and shown in the accompanying drawings, it is to be understood that such embodiments are merely illustrative and not restrictive, and that embodiments are not restricted to the specific constructions and arrangements shown and described since modifications may occur to those having ordinary skill in the art.

What is claimed:

1. A flux material comprising:
   a solution comprising a plurality of micellar structures in a solvent, the micellar structures each comprising a plurality of amphiphilic block copolymer elements, the amphiphilic block copolymer elements each comprising at least one non-polar region and at least one polar region; and
   a fluxing agent contained within the micellar structures.

2. The flux material of claim 1, wherein the micellar structures each include a central core region and the fluxing agent is contained in the central core region.

3. The flux material of claim 1, wherein the fluxing agent comprises an acid.

4. The flux material of claim 1, wherein the fluxing agent comprises a chelating material.

5. The flux material of claim 1, wherein the solvent comprises a polar material.

6. The flux material of claim 1, wherein the solvent comprises at least one material selected from the group consisting of water, glycol ethers, and alcohols.

7. The flux material of claim 1, wherein the amphiphilic block copolymer elements comprise a triblock structure selected from the group consisting of two hydrophilic regions and one hydrophobic region, or two hydrophobic regions and one hydrophilic region.

8. The flux material of claim 1, wherein the amphiphilic block copolymer elements comprise a diblock structure including one hydrophilic region and one hydrophobic region.

9. The flux material of claim 1, wherein the amphiphilic block copolymer elements comprise at least one material selected from the group consisting of: poly(ethylene oxide)-b-poly(butylene oxide)-b-poly(ethylene oxide), poly(ethylene oxide)-b-poly(ε-caprolactone)-b-poly(ethylene oxide), and poly(ethylene oxide)-b-poly(propylene sulfide)-b-poly(ethylene oxide), poly(propylene sulfide)-b-poly(ethylene oxide)-b-poly(propylene sulfide), and poly(propylene oxide)-b-poly(ethylene oxide)-b-poly(propylene oxide), poly(propylene oxide)-b-poly(ethylene oxide), and poly(dimethylsiloxane)-b-poly(ethylene oxide).

10. The flux material of claim 1, further comprising at least one functional group coupled to the amphiphilic block copolymer, the at least one functional group selected from the group consisting of organosilanes, zirconates, alkyl phosphate esters, amines, and metal organics.

11. The flux material of claim 1, wherein the amphiphilic block copolymer is present in a concentration of 10 to 40 weight percent in the solvent.

12. A method for forming an electronic assembly, comprising:
   providing a flux solution comprising a plurality of micellar structures in a solvent, the micellar structures each comprising a plurality of amphiphilic block copolymer elements, the amphiphilic block copolymer elements each comprising at least one non-polar region and at least one polar region, the micellar structures also including a fluxing agent contained therein;
   applying the flux solution to at least one of a first surface and a second surface, the first surface to be joined to the second surface;
   heating the flux solution to a temperature sufficient to decompose the micellar structures and release the fluxing agent therefrom; and
   joining the first surface to the second surface.

13. The method of claim 12, wherein the first surface comprises a bonding pad coupled to a semiconductor die and the second surface comprises a solder bump coupled to a substrate, and further comprising positioning an underfill material between the semiconductor die and the substrate.

14. The method of claim 12, wherein at least the amphiphilic block copolymer elements from the decomposed micellar structures are at least partially soluble in the underfill material.

* * * * *